Oct. 22, 1957  W. SCHMID  2,810,327
ELECTRIC FEELER CONTROL SYSTEM
Filed Sept. 23, 1952  6 Sheets-Sheet 1

Inventor:
Wolfgang Schmid
by Michael S. Striker
Agt.

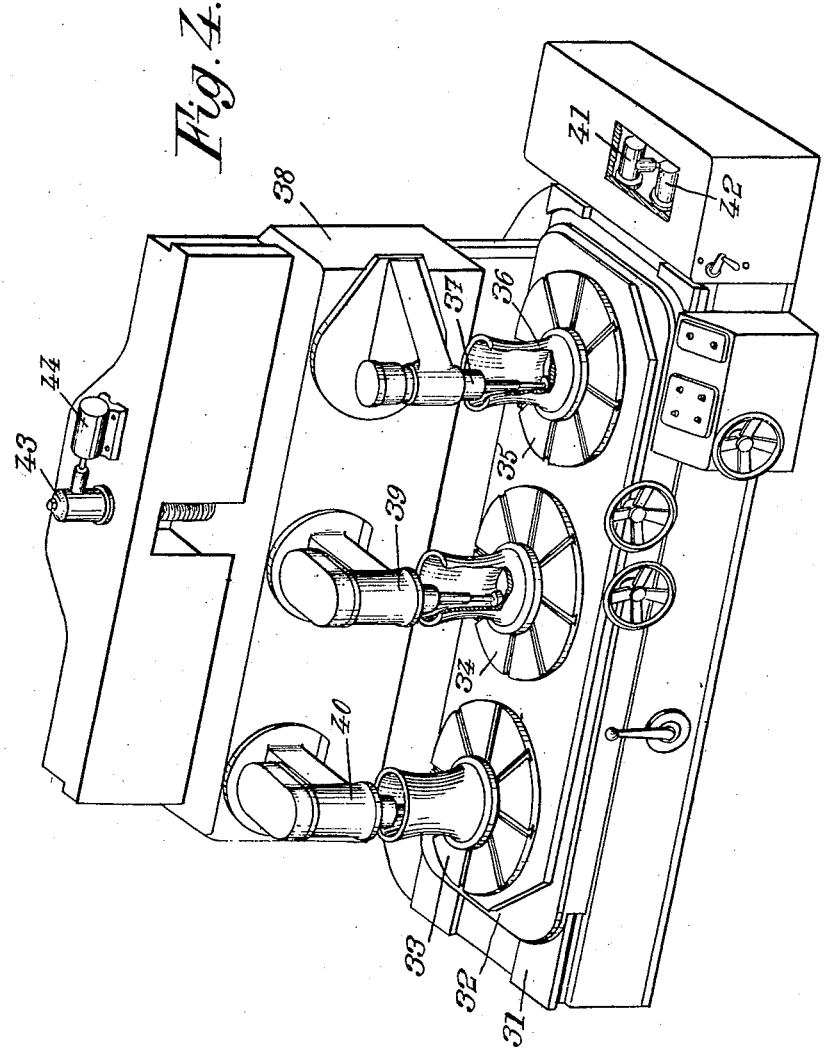

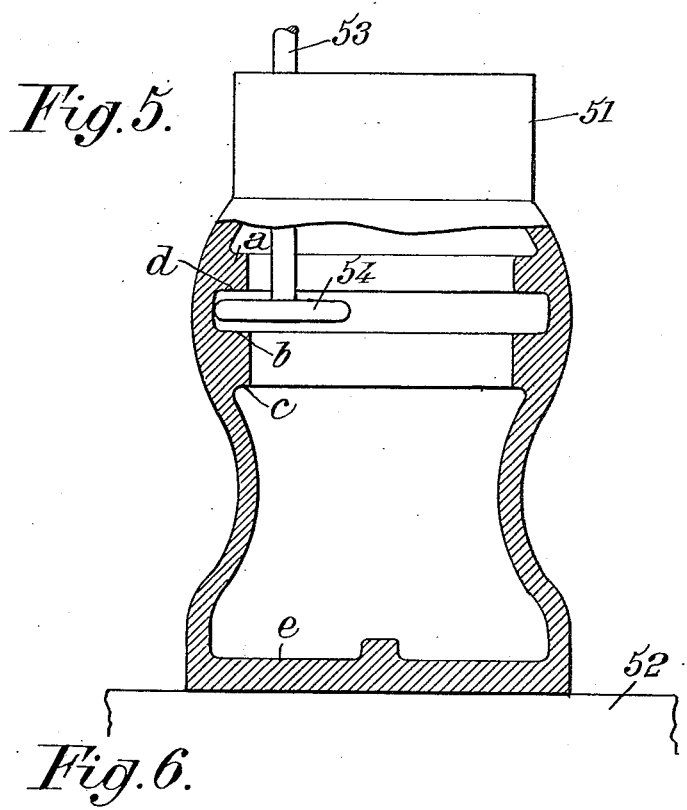
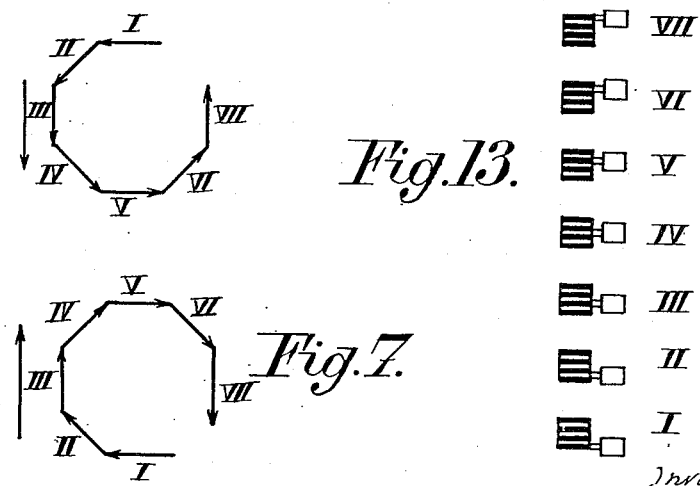

Oct. 22, 1957 W. SCHMID 2,810,327
ELECTRIC FEELER CONTROL SYSTEM
Filed Sept. 23, 1952 6 Sheets-Sheet 4

Oct. 22, 1957 W. SCHMID 2,810,327
ELECTRIC FEELER CONTROL SYSTEM
Filed Sept. 23, 1952 6 Sheets-Sheet 5
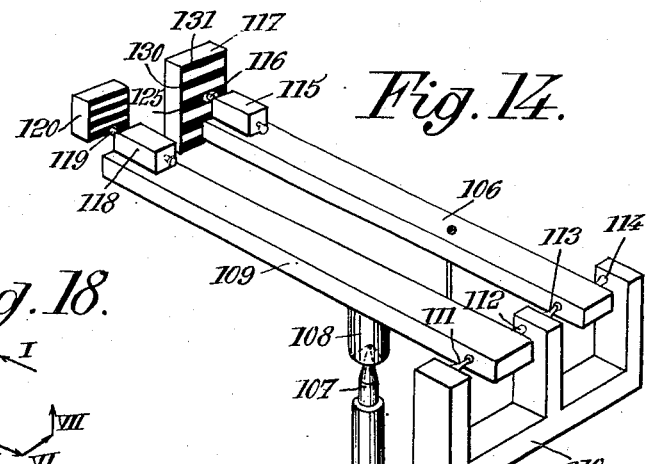
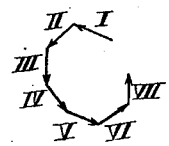
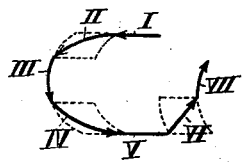
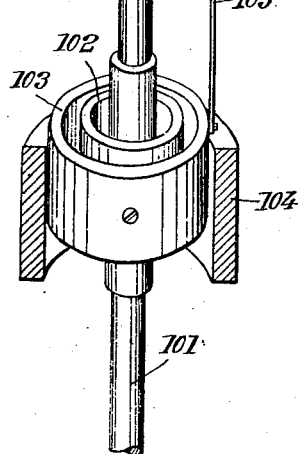
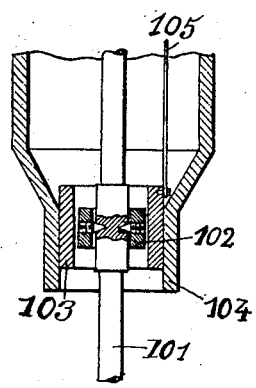
Inventor:
Wolfgang Schmid
by:
Michael S. Striker United States Patent Office 2,810,327
Patented Oct. 22, 1957

2,810,327
ELECTRIC FEELER CONTROL SYSTEM

Wolfgang Schmid, Gagny, France, assignor to Automata, Paris, France, a company

Application September 23, 1952, Serial No. 311,060

Claims priority, application Germany August 18, 1952

6 Claims. (Cl. 90—62)

Although it is possible to carry out the most varied copying work with known electric feeler control systems, there are types of work with which difficulties arise. This is the case, for example, when it is necessary to copy a cup-shaped workpiece, the internal contour of which is of irregular form and includes projections. If such a workpiece is attached to a circular table and is internally cut in spiral form, the vertical feed, because of the projections, must not be continuous. The vertical movement must be controlled by the feeler in the same way as the other movements. In the case of workpieces having an internal contour which is irregular but with no projections, this difficulty may be met by providing two templates and two feelers. However, this method is unsuccessful if the cavity to be copied also has different cross-sectional forms.

The present invention provides a means of so perfecting such feeler control systems that workpieces having such difficult shapes can also be satisfactorily copied with a single feeler. In this case, no special templates need be prepared. The feeler can directly explore the master workpiece, the contours of which can be accurately copied by means of the feeler and the control system. The adjustment of the machine is thereby also substantially simplified. These are only a few of the many advantages afforded by the present invention.

Figure 4 is a perspective view of an automatic copying milling machine having a special feeler which explores the internal contour of a pattern and thus controls all the movements of the machine which are essential for the copying.

Figure 5 is a partial sectional elevational view of a pattern the special feeler of which explores the internal contour.

Figures 6 and 7 are corresponding diagrams of the downward and upward movements of the feeler.

Figures 8 and 10 are respectively a sectional view taken on the line VIII—VIII of Figure 10 and a plan partly in section taken on the line X—X of Figure 8 of the special feeler, and Figure 9 is a partial sectional elevational view of the universal pivotal mounting of the latter.

Figure 11 is a circuit diagram of the corresponding electrical control mechanism.

Figure 12 is a diagram of the movements effected by means of this device.

Figure 13 shows diagrammatically the successive positions of the brush on the contacts for the seven kinds of orders provided.

Figure 14 shows in perspective another embodiment of the feeler with two bundles of contact blades.

Figure 15 is a detail view, in section, of the suspension of the feeler.

Figure 1:
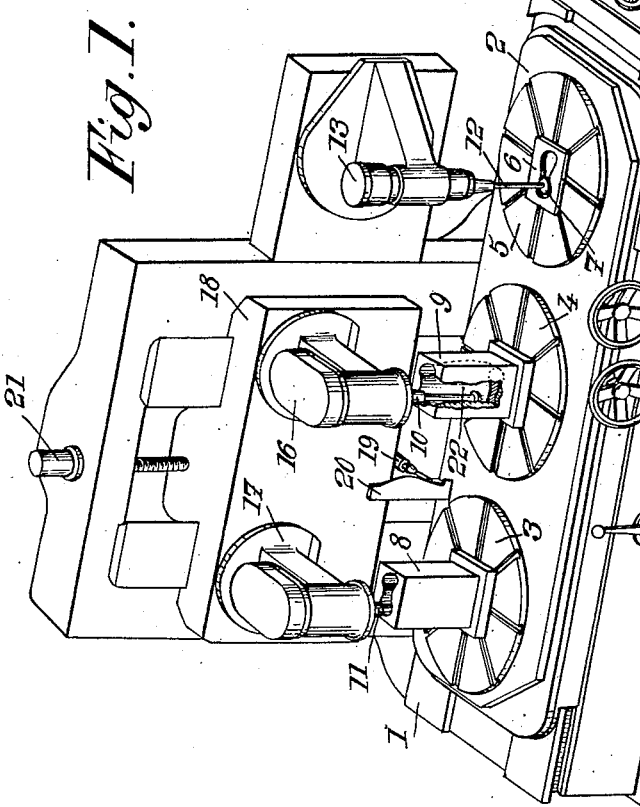
Figure 1 is a perspective view of a copying milling machine having three rotary tables, two feelers and two templates.

The copying milling machine illustrated in Figure 1 comprises a sturdy machine bed 1, along which slides the longitudinal table 2. Mounted on the longitudinal table are three circular tables 3, 4 and 5. The template 6, having an internal contour 7, is clamped to the circular table 5. Workpieces 8 and 9 are mounted on the circular tables 3 and 4, respectively. The internal contours of the two workpieces are milled out by the two milling cutters 10 and 11. For this purpose, the internal contour 7 of the template 6 is followed by the feeler spindle 12 of the feeler 13. The feeler spindle is thus laterally deflected and actuates electric contacts in the feeler mechanism. The movement of the longitudinal table 2 is controlled by the magnetic reversing clutch 14 and the rotational movement of the circular tables is controlled by the magnetic reversing clutch 15, as already described in co-pending application Serial No. 311,058. The feeler thus automatically explores the contour 7 and thereby so controls the movements of the workpieces 8 and 9 through the clutches 14, 15 that the milling cutters 10 and 11 cut the same internal contour in the latter. While the feeler 13 is stationary in space, the two cutter heads 16 and 17 are mounted on the vertical slide 18, on which the second feeler 19 exploring the template 20 is also mounted. The feeler 19 controls principally the magnetic clutch 21 for the vertical movement of the slide 18. The contour of the template 20 corresponds to the internal contour 22 of the workpiece. The feeler 13 thus controls five different directions of movement extending in the horizontal plane, parallel to the surface of the circular tables. The second feeler 19 also controls five directions of movement, these extending, however, perpendicular to the movements of the feeler 13.

Figure 2:
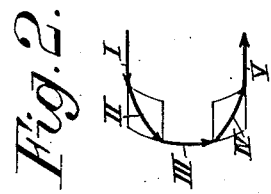

Figure 2 shows the movements controlled by the feeler 13.

Figure 3:
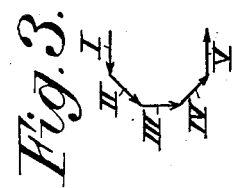
Figures 2 and 3 are diagrams of the movements controlled by each of the two feelers of the machine.

Figure 3 shows the movements controlled by the feeler 19.

With this type of control system, difficulties arise in copying workpieces whose cross-sections vary in different ways.

Figure 4 shows an automatic copying milling machine comprising a special feeler which explores the internal contour of a pattern and thereby directs all the movements of the machine which are necessary for the copying work. The movements of this machine are controlled by a single feeler which explores the internal contour of a pattern. The longitudinal table 32 supporting the three circular tables 33, 34 and 35 slides on the machine bed 31. Mounted on the circular table 35 is the pattern 36, the internal contour of which is explored by the feeler 37. The two cutter heads 39 and 40 and the feeler 37 are secured to the vertical slide 38. The movement of the longitudinal table is controlled by the magnetic reversing clutch 41 and the movement of the circular tables are controlled by the reversing clutch 42, a reversing clutch 43 being provided for the vertical movements. The latter is driven by the motor 44. A separate motor is also provided to drive the other two reversing clutches. All three electromagnetic reversing clutches are controlled by the deflections of the feeler spindle.

Figures 5 to 13 illustrate the principles in accordance which the new copying arrangement comprising the special feeler operates. Figure 5 shows the internal contour of a cup-shaped workpiece 51 which is to be copied, the said workpiece being secured to the circular table 52. The feeler spindle 53 and the feeler disc 54, which corresponds in shape to the cutter, explore the internal contour of the cup-shaped workpiece, or of a corresponding pattern. The exploring operation can be commenced either at the upper end of the cavity or at the base surface. If the exploring operation commences at the upper end, the feeler spindle is forced upwardly in the axial direction at the projections a, b. If the exploring operation commences at the base surface, the feeler spindle is drawn downwardly in the axial direction at the points, c, d, the circular tables also rotating during the exploring operation, so that the internal contour is spirally explored.

Figure 8 shows the construction of the special feeler. The feeler spindle 53 supports the feeler disc 54. The feeler spindle is mounted in the sleeve 63 and is axially movable therein. The feeler spindle is held in the central position by the springs 64 and 65. The sleeve 63 is mounted so that it can be deflected in all directions. Mounted on the upper end of the feeler spindle is a sliding pin 66 which engages a cone 67. The cone 67 is secured to a lever 68 which is pivotally mounted at the fulcrum point 69. If the feeler spindle is laterally deflected, it forces the sliding pin 66 along the cone 67, whereby the lever 68 is upwardly pivoted. Secured to one end of the lever 68 is a brush holder 70 in which the brush 71 is mounted. The brush 71 slides along a contact block 72 which consists of a number of copper laminations, between which layers of insulation, for example mica sheets, are embedded. If the feeler spindle undergoes a lateral deflection, the lever 68 is upwardly pivoted, the contact brush 71 sliding along the contact block 72. If the feeler spindle 53 is moved upwardly in the axial direction, the spring 64 is compressed and the lever 68 is also forced upwards by the sliding pin 66 in which case the brush 71 also slides upwardly along the contact block 72. If the feeler spindle is drawn downwardly in the exploring operation, the feeler must also emit the correct signals in this case. For this reason, the feeler has been so designed that the lever 68 is also upwardly pivoted in this case. For this purpose, there is mounted in the feeler spindle a pin 73 to which a rod 74 is secured. The sleeve 63 is formed with a slot in which the pin 73 can be moved up and down by a small amount. The upper end of the rod 74 is guided by the lever 68 and provided with a screwthread on which the nut 75 is also mounted. If the feeler spindle is moved axially upwards, the rod 74 also moves upwards with the nut 75. The nut 75 then no longer bears against the lever 68. The rod 74 has no influence on the deflection of the lever 68 in this case. However, if the feeler spindle 53 is drawn in the downward direction, the rod 74 also moves downwards, the nut 75 and the lever 68 being so deflected that the brush 71 slides upwards along the contact block 72. The vertical movement of the feeler spindle is limited by the two abutment rings 76 and 77. The spring 78 retains the lever 68 in the horizontal position when the feeler is free, that is to say, not in contact with the pattern.

Figure 11 shows the copper laminations of the laminated contact 72 with the relays connected thereto and the magnetic clutches by which the movements of the machine are controlled. The winding of the relay R1 is connected to the lowermost copper lamination 79. The end of the coil of the relay R2 is connected to the copper lamination 81. The copper lamination 80 is electrically connected to one end of each of the windings of the relays R5 and R3. The end of the winding of the relay R4 is connected to the copper lamination 82. All the relays have normally open contacts by which the magnetic clutches are connected into the circuit. When the feeler is in the undeflected position, the brush 71 bears on the copper lamination 79. The relay R1 is thereby energised and closes its normally open contacts. The magnetic clutch K1, for the movement of the longitudinal table to the right, receives voltage through this closed contact of relay R1. The longitudinal table moves in such manner, together with the circular table mounted thereon, that the contour of the pattern travels towards the feeler spindle. This movement corresponds to the feeler signal I of Figure 12. When the feeler disc 54 of the feeler comes into contact with the contour of the pattern and the feeler spindle is thereby aterally deflected, the feeler moves into the second signal position II. The brush 71 thus slides upwardly and bears on the two copper laminations 79 and 80 simultaneously as shown in Figure 13. Three movements are then simultaneously carried out. The circular table turns in the counter-clockwise direction, that is to say, to the left, the longitudinal table 32 moves to the right and the vertical slide 38 moves downwards. The direction of movement of the vertical slide 38 can also be simply reversed by interchanging the terminals f, g and h, j. Since the feeler controls five different types of movement when laterally deflected and seven types of movement when axially deflected, all shapes occurring in practice can be copied with this control system. As will be seen from Figure 13, the vertical movement never commences until the feeler bears against the contour of the pattern and enters the signal position II. In the signal position VI, the vertical movement is reversed, so that the projecting portions having inclined edges can be explored. As will be seen from the circuit diagram of Figure 11, all the movements are controlled by only four copper laminations and five relays. Despite the complicated switching function of the feeler, the construction of the control system is extremely simple. The external contours of such cup-shaped workpieces can also be similarly copied with this control system. The same control system can also be employed for copying operations with which the pattern and the workpieces are arranged to remain stationary in space and the feeler and the tool carry out all the necessary working movements. In this case, the movements of a cross slide are controlled by the lateral deflections of the feeler spindle. In this way, contours of very complicated form having projections and the like similar to those shown in Figure 5 can also be automatically cut on large dies. The described control system may also be advantageously employed to cut blades of complicated form, such as are employed in jet engines.

Figures 14–18 show a further constructional form of the control system. In accordance with Figure 14, the feeler spindle 101 is mounted in the gimbal rings 102 and 103, so that it can be deflected in all directions. The gimbal ring 103 is mounted in the sleeve 104 and is axially displaceable therein as shown in Figure 15. Attached to the gimbal ring 103 is the rod 105, the upper end of which is rigidly connected to the lever 106. A sliding pin 107 engaging the cone 108 is mounted on the upper end of the feeler spindle 101. The cone 108 is secured to the lever 109. If the feeler spindle is laterally deflected, the lever 109, which is mounted between the points 111 and 112 in the bracket 110, is pivoted upwardly. If the feeler spindle undergoes an axial deflection either upwards or downwards, the lever 106 mounted between the points 113 and 114 is also deflected upwards or downwards. Mounted on one end of the lever 106 is a brush holder 115 which supports a brush 116. The brush 116 slides along a contact block 117. Mounted on the lever 109 is a brush holder 118 carrying a brush 119 which slides along a contact block 120. Seven different movements in the plane extending at right angles to the axis of the spindle of the feeler are controlled by the brush 119. The carbon brush 116 controls the vertical movement and also an additional movement at right angles thereto, i. e. in the horizontal plane.

Figure 16:
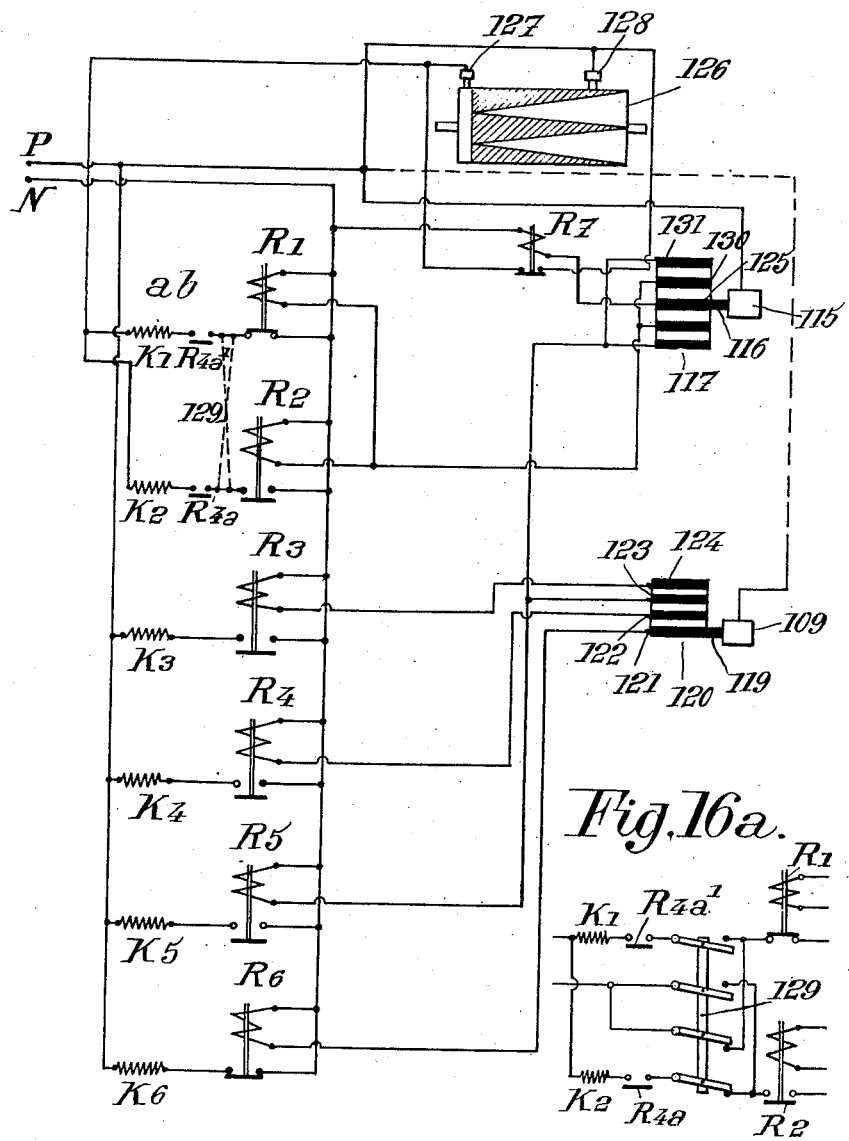
Figure 16 is the circuit diagram for that feeler and Figure 16a a detail of the circuit of Figure 16 and Figures 17 and 18 are diagrams of the movements corresponding to the series of orders given respectively by each of the two bundles of contact blades.
Figure 16A:
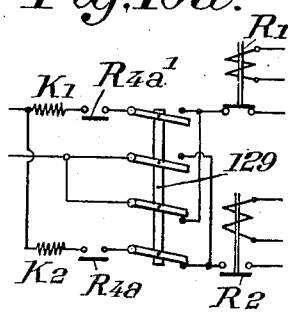

Figure 16 shows one of the many circuit combinations possible with this new type of control system. The contact block 120 has four conductive segments 121, 122, 123, and 124. The segment 121 is connected to the end of the winding of the relay R6, the segment 123 to the end of the winding of the relay R5, the segment 122 to the end of the winding of the relay R4 and the segment 124 to the end of the winding of the relay R3. The relays R5 and R6 control the magnetic clutches K5 and K6 respectively for the movement of the longitudinal table. The relays R3 and R4 control the magnetic clutches K3 and K4 respectively for the movement of the circular table.

Figure 17 shows the seven different types of movement which are successively carried out when the brush 119 moves upwards along the contact block 120. Figure 18 shows the seven different movements controlled by deflection of the lever 106 and the brush 116. When the feeler spindle is in the undeflected position, the brush 116 lies on the segment 125. The latter is connected to the end of the coil of the relay R7, so that the relay R7 has closed its normally open contacts. The magnetic clutches K1 and K2 for the vertical movement are connected to a drum controller 126, whereby the speed of the vertical movement can be regulated. This drum controller consists of an insulating member on which electrically conductive segments are mounted, as described in my co-pending application Serial No. 311,058. The two brushes 127 and 128 of the controller drive are connected to the normally open contacts of the relay R7. As soon as the feeler disc bears against the contour of the pattern and thereby undergoes a lateral deflection, the brush 119 travels upwardly, so that it now bears on the two copper laminations 121 and 122. The relay R4 is thus energized and, by means of its contact R4a1 which is connected in circuit with the relay R1 and thus follows the movement thereof, places the magnetic clutch K1 in circuit. A switch 129 is provided for reversing the vertical movement. The exploring operation commences at either the top or the bottom of the workpiece, and accordingly, the vertical movement must be changed-over at the commencement of the working operation. It will be assumed that the exploration takes place from the top downwards and the clutch K1 is energised by the lever 129. The vertical slide moves rapidly downwards, so that the contour of the pattern is spirally explored. If the pattern has a projection which is encountered by the feeler spindle, and the latter is thereby forced upwards, the lever 106 is deflected upwards and the brush 116 moves upwards along the contact block 117 until finally the brush 116 is no longer in contact with the lamination 125 and the relay R7 is deenergized. The magnetic clutch K1 is then energized through the drum controller, that is to say, it continuously receives brief current impulses. The current then flows from the main conductor P through the brush 128 through the cross-hatched segment 127 to the brush 127 and to the coil of the magnetic clutch K1, through the closed contact R4a1, and through the closed contact of the relay R1 to the main conductor N. The vertical movement then takes place substantially more slowly. If the feeler spindle undergoes a greater deflection in the axial direction, so that the brush 116 bears on the contact 130, the coil of the relay R1 and the coil of the relay R2 are energised. The relay R1 opens its normally closed contact, whereby the magnetic clutch K1 is deenergized. The relay R2 closes its normally open contact, whereby the magnetic clutch K2 for the movement of the vertical slide in the upward direction, is energised. In order to remove the feeler from the projecting surface, a further contact 131 is provided. The copper lamination 131 of the contact block 117 is conductively connected to the copper lamination 123 of the contact block 120. As soon as the brush 116 comes into contact with the copper lamination 131, the relay R5 is energised and energises, through its closed contact, the magnetic clutch K5 for the movement of the longitudinal table to the right. Due to the movement of the longitudinal table to the right, the feeler is thus retracted from the projection. This special control is necessary, because it may happen that, on encountering such projections, the feeler spindle is deflected only axially, and not laterally. As may be seen from the examples hereinbefore described, this new control system permits of various types of control. Instead of the seven movements in the horizontal plane in accordance with Figure 17, seven different types of movement can be controlled by the lateral deflection of the feeler spindle, as described in the aforesaid patent application. This is important if the contour has very complicated forms and both the workpieces and the pattern are mounted on circular tables. However, even if the workpiece and the pattern are arranged to remain stationary in space, and the feeler must travel around a complete contour, an increase in the number of control actions initiated by the feeler when laterally deflected is important. The drum controller 126, which is driven by a separate drive, may also be provided with a number of brushes. If corresponding laminations are provided on the contact block 117, and are connected to those brushes, a step-by-step speed regulation of the vertical movement can be produced on axial movement of the feeler.

The control system thus permits the most varied modifications, whereby the universal applicability of the machines provides with such control systems can be considerably widened.

I claim:

1. In a pattern controlled machine tool, in combination, a plurality of switch means for operating the machine tool; supporting means; an elongated tracer member having a pattern engaging portion and being mounted on said supporting means movable in longitudinal direction thereof and movable with at least its pattern engaging portion in directions transverse thereto; and actuating switch closing means interconnecting said elongated tracer member with said plurality of switch means and differently operated by said tracer member during longitudinal and lateral movements thereof in different directions so as to differently actuate said plurality of switch means during each of said different movements.

2. In a pattern controlled machine tool, in combination, a plurality of switch means for operating the machine tool; supporting means; an elongated tracer member having a first and second end and having a pattern engaging portion at its first end, said tracer member being mounted intermediate its ends pivotally and axially slidably on said supporting means so as to be movable in longitudinal direction thereof and movable with at least its pattern engaging portion in directions transverse thereto, said tracer member being formed with a tapered end portion at its second end; and actuating switch closing means interconnecting said elongated tracer member at its second end with said plurality of switch means and differently operated by said tracer member during movements thereof in different directions so as to differently actuate said plurality of switch means during each of said different movements, said actuating switch closing means including lever means pivotally mounted at one end on said support means and having switch contact means at its other end movable with said lever means during pivoting thereof for contacting different ones of said plurality of switch means, said lever means having intermediate its ends an engaging portion formed with a conical recess engaged by said tapered end portion of said tracer member so as to be movable thereby about its pivot axis during movement of said tracer member in said different directions.

3. In a pattern controlled machine tool, in combination, a plurality of switch means for operating the machine tool; supporting means; an elongated tracer member having a pattern engaging portion at one end and being mounted intermediate its ends pivotally and axially slidably on said supporting means so as to be movable in longitudinal direction thereof and movable with at least its pattern engaging portion in directions transverse thereto; actuating switch closing means interconnecting said elongated tracer member at its other end with said plurality of switch means and differently operated by said tracer member during movements thereof in different directions so as to differently actuate said plurality of switch means during each of said different movements; and alongated connecting means connected at one end to said tracer member for movement therewith in longitudinal direction and engageable at its other end with said actuating switch closing means for moving the latter means only during movement of said tracer member in longitudinal direction thereof away from said actuating switch closing means.

4. In a pattern controlled machine tool, in combination, a plurality of switch means comprising a series of spaced electrical contact members and relays operatively associated with said electrical contact members for operating the machine tool; supporting means; an elongated tracer member having a pattern engaging portion at one end and being mounted intermediate its ends pivotally and axially slidably on said supporting means so as to be movable in longitudinal direction thereof and movable with at least its pattern engaging portion in direction transverse thereto; and actuating switch closing means interconnecting said elongated tracer member at its other end wtih said plurality of switch means and differently operated by said tracer member during movements thereof in different directions so as to differently actuate said plurality of switch means during each of said different movements, said actuating switch closing means including lever means pivotally mounted at one end on said support means and having contact brush means at its other end movable with said lever means during pivoting thereof for sliding over and thereby contacting different ones of said series of electrical contact members, said lever means being engaged intermediate its ends by said other end of said tracer member so as to be movable thereby about its pivot axis during movement of said tracer member in said different directions.

5. In a pattern controlled machine tool, in combination, two sets of switch means each having a series of electrical contact members for operating the machine tool; supporting means; an elongated tracer member having a pattern engaging portion at one end and being mounted intermediate its ends pivotally and axially slidably on said supporting means so as to be movable in longitudinal direction thereof and movable with at least its pattern engaging portion in directions transverse thereto; and actuating switch closing means interconnecting said elongated tracer member at its other end with said plurality of switch means and differently operated by said tracer member during movements thereof in different directions so as to differently actuate said plurality of switch means during each of said different movements, said actuating switch closing means comprising two pivotally mounted lever members extending transverse said elongated tracer member, and an elongated connecting member connecting one of said lever members to said elongated tracer member for displacement of said one lever member only by longitudinal movement of said tracer member, the other lever member being engaged by the other end of said tracer member for displacement thereby, each lever member having switch contact means at one end thereof movable therewith for contacting different ones of said series of electrical contact members in said two sets of switch means, respectively.

6. In a pattern controlled machine tool, in combination, a plurality of switch means for operating the machine tool; supporting means; an elongated tracer member having a pattern engaging portion and being mounted on said supporting means movable in longitudinal direction thereof and movable with at least its pattern engaging portion in directions transverse thereto; actuating switch closing means interconnecting said elongated tracer member with said plurality of switch means and differently operated by said tracer member during movements thereof in different directions so as to differently actuate said plurality of switch means during each of said different movements; and moving means connected in circuit with said plurality of switch means for moving said tracer member and the pattern to be engaged thereby relative to each other in opposite directions in a plane normal to said tracer member, for rotating the same relative to each other in opposite senses, and for moving said tracer member in opposite directions along the axis thereof relative to the pattern.

References Cited in the file of this patent
UNITED STATES PATENTS

| | | |
|---|---|---|
| 2,334,956 | Ridgway | Nov. 23, 1943 |
| 2,388,555 | Kuehni et al. | Nov. 6, 1945 |
| 2,445,971 | Rosen | July 27, 1948 |
| 2,455,882 | Shaw | Dec. 7, 1948 |
| 2,511,956 | Wetzel | June 20, 1950 |